E. RORIVE.
TOOL SHARPENING AND GAGING MACHINE.
APPLICATION FILED OCT. 29, 1912.
1,082,823.
Patented Dec. 30, 1913.
3 SHEETS—SHEET 1.
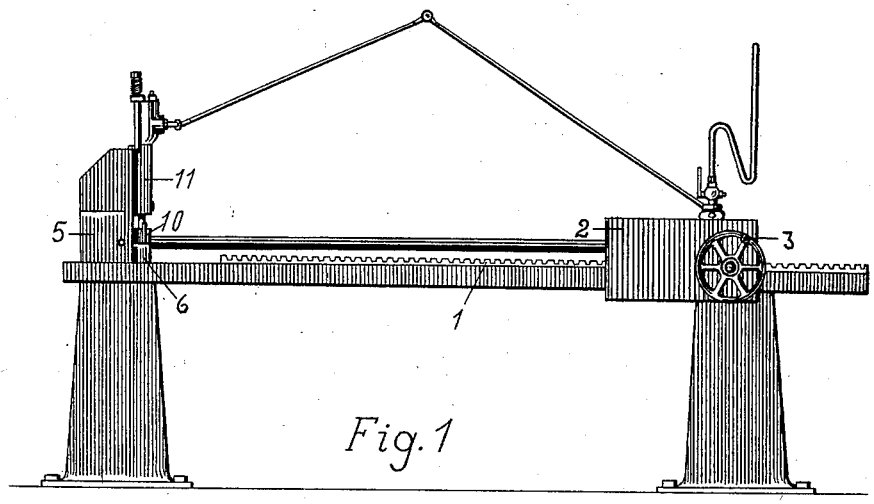
Fig. 1
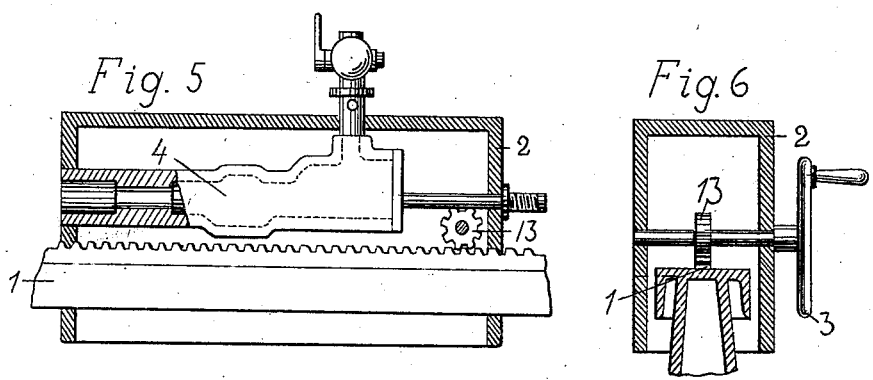
Fig. 5
Fig. 6
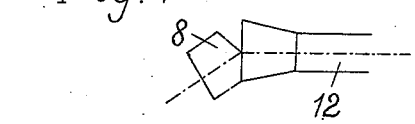
Fig. 7
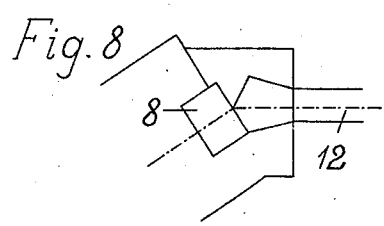
Fig. 8
WITNESSES:
P. Philipp.
E. Leone
INVENTOR:
ERNEST RORIVE,
BY HIS ATTORNEY, John C. Seifert

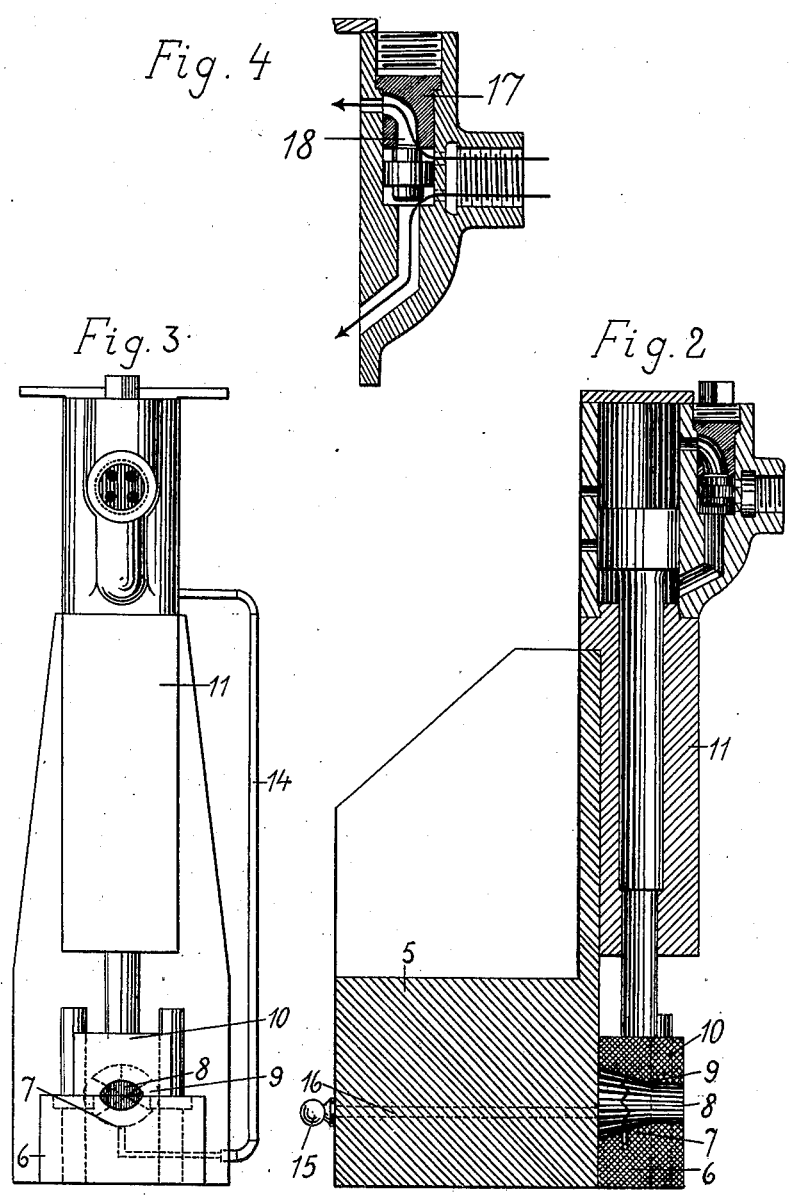

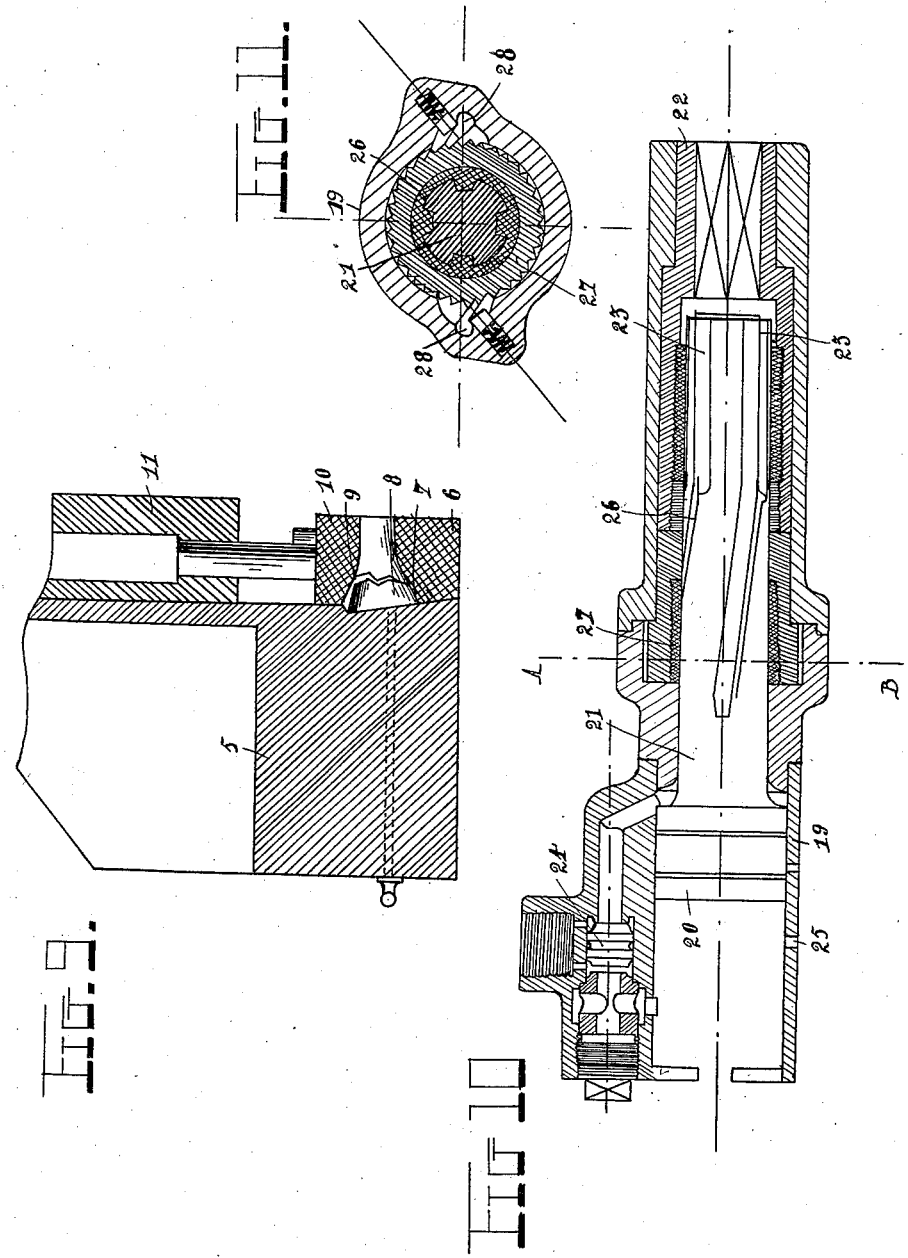

UNITED STATES PATENT OFFICE.

ERNEST RORIVE, OF BRUSSELS, BELGIUM.

TOOL SHARPENING AND GAGING MACHINE.

1,082,823.　　　　　　　Specification of Letters Patent.　　　Patented Dec. 30, 1913.

Application filed October 29, 1912. Serial No. 728,475.

*To all whom it may concern:*

Be it known that I, ERNEST RORIVE, a subject of the King of Belgium, residing at Brussels, Belgium, have invented new and useful Improvements in Tool Sharpening and Gaging Machines; and I do hereby declare the following to be a full, clear, and exact description of the same.

The present invention has for its object a tool sharpening and gaging machine for rock drills, chisels and other tools for working iron or stone.

This machine is essentially characterized by the fact that the tool to be sharpened, rock drill, etc., while it is being knocked upon by a pneumatic hammer and pushed with its end to be sharpened, into a die or matrix having the profile of the cutting edge to be given to said tool, the gaging of the head of the tool is carried out by a vertical hammer, knocking at each stroke on the periphery of the said head.

It is furthermore characterized by the fact that simultaneously with the two above processes the tool is rotated around its own axis by its hammer which is rotatable, this rotation of the tool to be sharpened carries around the matrix which can freely rotate in its bearing, in such a way that very small part only of the cutting edge be sharpened at a time, as will be described farther on; this rotation furthermore enables to gage the head of the rock-drill or other tool in an absolutely perfect way by means of the ram of the vertical hammer; the said ram is provided at its bottom, with a recess engaging nearly half of the head of the tool and being completed by a second recess provided in the stationary lower part or anvil of the above said hammer.

The invention is furthermore characterized by the simultaneousness of the operation of the vertical and of the horizontal hammer, the rapid striking of the former favoring, in an important way, by the forging to which it submits the head of the rock drill or other tool, the effect of the latter one, say the total introduction by pressure of the cutting edge of the tool into the profile of the matrix, or the sharpening of the rock-borer or any other tool.

It is also characterized by the special way in which the mass of the head of the tool is worked or forged in a certain sense, in order to take in a perfect manner the profile of the matrix, owing to the fact that a part only of the cutting edge of the tool is engaged, at a given moment in the matrix, while the remainder can extend freely, owing as well to the clenching by the matrix as to that produced by the strokes of the vertical hammer.

The invention is furthermore characterized by the advancing device for the horizontal hammer and the tool to be sharpened as will be described farther on.

It is also characterized by the rational modification in the pneumatic hammers.

It is also characterized by the application of an ejector with a view of very easily pushing the matrix out of its bearing when it is to be replaced.

It is finally characterized by the fact that the cylinder of the vertical pneumatic hammer is connected to the bearing of the matrix and of the head of the tool to be sharpened, by means of an auxiliary tube, by means of which at each stroke of the piston a jet of air is admitted into the said bearing in order to expel the scales or battiture produced by the shock of the hammer on the tool and which would be noxious to the perfectness of the cutting edge.

A machine embodying the object of the present invention is represented by way of example, in the annexed drawing.

Figure 1 is a side view of the whole apparatus. Fig. 2 is a side view, partially in section, and on a larger scale, of the abutment with its vertical pneumatic hammer and the bearing of the matrix and of the head of the rock drill or other tool. Fig. 3 is a corresponding front view. Fig. 4 is a view of detail showing the modification of the construction of the pneumatic hammers. Fig. 5 is a side-view, partially in section showing the arrangement of the horizontal hammer in its casing, being also its carriage and the way in which this carriage travels on the toothed rack of the bed or frame. Fig. 6 is a corresponding end view, also partially in section. Fig. 7 is a diagrammatical view showing the angular arrangement of the axis of the matrix on the axis of the rock drill or any tool in order to obtain straight cutting edges. Fig. 8 is a corresponding diagrammatical view showing the arrangement which enables to obtain conical cutting edges. Fig. 9 is a fragmentary side view, partially in section, showing the inclination of the matrix and its bearing on the axis of the tool. Fig. 10 is a central longitudinal section of the automatically rotating horizontal pneumatic hammer operating the end of the tool to be sharpened; and Fig. 11 is a cross-section of the same on line A—B in Fig. 10.

The sharpening machine which constitutes the object of the present invention comprises a long stretched frame having the form of a bed, provided on a part of its length with a toothed rack 1 on which the carrier 2 can be moved by means of a hand wheel 3. The carrier 2 contains a rotatable or automatically rotating pneumatic hammer 4 of any known type. The tool to be sharpened is fixed by its rear end, for instance of square section, into the said pneumatic hammer. Such a pneumatic hammer is shown on a large scale in Figs. 10 and 11. Movable in the cylinder 19 of the said pneumatic hammer is a piston 20 having a part 21 extending to the end of the tool to be sharpened, said end being inserted in a square hole of a sleeve 22 having longitudinal grooves or ribs engaging corresponding grooves 23 in the forward end of the piston. The distribution of the compressed air is controlled in the usual manner by a valve 24 coöperating with the exhaust openings 25 in the cylinder 19. The part 21 of the piston is provided behind the grooves 23, with windings 26 of very large pitch engaging corresponding windings in a ratchet sleeve 27 surrounding the said part of the piston. The sleeve 27 is provided at its periphery with ratchet teeth engaged by spring-actuated pawls 28 in such a manner that the said sleeve is free to turn when the piston moves forward (toward the tool), whereas it is locked in position when the piston moves backward so as to cause the piston and thereby the sleeve 22 surrounding the fore part of the piston, and the tool inserted in the said sleeve 22, to turn an angle corresponding to the pitch of the windings 26. It will thus be seen that the tool is turned a certain angle each time the piston recedes from the same. The pneumatic hammer such as above is generally known and is not claimed as new by the inventor.

An abutment 5 is provided at the end of the bed. A stationary mass 6 forms one piece with the abutment 5 or is fixed thereto in any suitable way; it may also be fixed directly to the bed itself. In the widest part of a recess 7 of the piece 6 the matrix 8 rests freely so as to be able to rotate but not to move either longitudinally or laterally. The head of the tool to be sharpened will also rest in this recess 7 when it has been pushed forward by means of the carrier 2 and the above-said advancing device. The recess 7 is completed by a corresponding recess 9 of the ram 10 of a vertical pneumatic hammer 11, so as to form a cavity inclosing completely the matrix and the head of the tool. The pneumatic hammer 11 moves up and down but does not rotate.

In order to sharpen and gage a tool, for instance a rock-drill 12, the head is heated as is done for forging purposes and the square rear end is introduced into the horizontal pneumatic hammer 4; then this hammer is advanced together with the rock-drill by means of the carriage 2 which travels on the toothed rack 1 by means of its toothed wheel 13; for this purpose said carriage is provided with a hand wheel 3. At this moment the pneumatic hammers are not operating and the ram 10 is maintained in its highest position through a suitable retaining device, not represented. As soon as the head of the tool has been placed in the bearing 7 opposite the matrix 8 the ram 10 is allowed to drop and the cocks which admit the compressed air to the pistons of the hammers are opened. The automatically rotating horizontal hammer 4 strikes in the axis of the tool and pushes it at each stroke farther into the matrix 8; at the same time the matrix 8, which turns freely in its support, is carried around by the rotation of the tool; after a few seconds the cutting edge of the head of the tool is entirely sharpened. Better results are obtained more rapidly and with less expense of energy by the slight inclination of the matrix and its bearing on the axis of the tool, as is shown in Figs. 7, 8 and 9. In this way a part only of the cutting edge of the tool is sharpened at a time and the matrix is carried around like a conical gearing by the rock drill or other tool, so that all the parts of the cutting edge are successively sharpened. The results obtained are superior in this way that no brutal stamping takes place, as would be the case otherwise, but, on the contrary, a certain kneading of the cutting edge which can expand at certain places where it is not in engagement with the matrix and it is thus forced to more completely take the profile of this matrix. It is however well understood that the inventor reserves for himself the right to arrange these matrices either in the axis of the rock drill or any other tool or obliquely to this axis. While the sharpening of the cutting edge takes place by the strokes of the horizontal hammer in the axis of the tool, the gaging of the head of the said tool is carried out by the strokes of the vertical hammer.

As has been said above, the ram 10 is provided at its face with a recess 9 completing the recess 7 in the anvil so as to form a bearing engaging the sides of the head of the rock borer or other tool. The thus formed bearing or box is somewhat wider than high; the head of the tool is thus constantly forged and the forcing of the cutting edge into the matrix is notably favorized; in fact, as soon as the vertical hammer strikes on the head of the tool, this is slightly flattened transversely; but at the following moment as the tool is rotating on its axis, its head presents its largest diameter in the vertical direction in order to be again clenched by the ram; this clenching thus takes place in an uninterrupted way and in all directions and while the gaging takes place the sharpening is sensibly favorized. It is in fact easy to understand that under the effect of the stroke of the vertical hammer the mass of the head is not only clenched transversely but also longitudinally and this mass is thus forced into the profile of the matrix.

As has been stated above, the sharpening of a rock drill or other tool by means of the machine forming the object of the present invention is effected, within a few seconds. If one takes into consideration, on one hand that it is extremely often necessary to sharpen for instance rock drills, and on the other hand the relatively long time which is necessary with the old machines, one will understand the importance and the value of the device forming the object of the present invention.

When the matrix is to be replaced or simply to be extracted it will suffice to lift the ram 10 and to retain it by its retaining device, then to knock on the button 15 of a rod 16 which crosses the abutment 5; the front end of the ejector 16 then pushes the matrix and makes it travel up the incline of the recess 7 and thus pushes it out most easily.

To the cylinder of the vertical hammer 11 is connected a pipe 14 which ends at the bearing 7, 9 of the matrix and of the head to be sharpened, in such a way that, at each stroke of the piston air is blown into the said bearings, in order to expel the batture produced by the stroke of the hammer on the tool and which would be noxious to the cleanness of the cutting edge.

What I claim is:

1. In a pneumatic tool sharpening machine, the combination with a matrix and a horizontal reciprocable hammer carrying the tool adapted to force the head of the tool into the matrix, of a vertically reciprocable hammer to gage the head of the tool.

2. In a pneumatic tool sharpening machine, the combination of a horizontal reciprocable hammer having means to carry the tool; an anvil; a support for the head of the tool to be sharpened; a matrix also carried by said support and abutting against said anvil; and a vertical reciprocable hammer having a head conforming to the tool support, and said support and vertically reciprocable hammer adapted to gage the head of the tool.

3. In a pneumatic tool sharpening machine, the combination of a horizontal reciprocable hammer, having means to carry the tool; an anvil; means to adjust said hammer means to rotate the hammer and tool as the hammer is reciprocated; a support for the head of the tool to be sharpened; a matrix also carried by said support against axial and lateral movement but to have rotative movement; and a vertically reciprocable hammer conforming to the tool head and support to gage the head of the tool; said matrix adapted to rotate with the tool.

4. In a pneumatic tool sharpening machine, the combination of a horizontal reciprocable hammer having means to carry the tool; an anvil the face of which is arranged obliquely to the axis of the tool; means to rotate the hammer and tool as the hammer is reciprocated; a support for the head of the tool to be sharpened; a matrix also carried by said support against axial and lateral movement but to have rotative movement, said matrix abutting against the oblique face of the anvil so that its axis of rotation will be at an inclination to the axis of rotation of the tool; and a vertically reciprocable hammer conforming to the tool head and support to gage the head of the tool, substantially as and for the purpose specified.

In testimony whereof, I have signed my name to this specification in the presence of two subscribing witnesses.

ERNEST RORIVE.

Witnesses:
E. BORGHAUR VON MILUL,
CHAS. ROY NASMITH.

Copies of this patent may be obtained for five cents each, by addressing the "Commissioner of Patents, Washington, D. C."